United States Patent [19]
Falke

[11] 3,924,054
[45] Dec. 2, 1975

[54] CURRENT CONDUCTING SYSTEM HAVING ADJUSTABLE HEAT DISSIPATION CAPABILITY

[75] Inventor: Henning Falke, Angermund, Germany

[73] Assignee: AEG-Telefunken Kabelwerke Aktiengesellschaft, Rheydt, Germany

[22] Filed: Nov. 19, 1973

[21] Appl. No.: 416,815

[30] Foreign Application Priority Data
Nov. 18, 1972 Germany............................ 2257133

[52] U.S. Cl............ 174/15 C; 174/27; 174/110 PM
[51] Int. Cl.²........................................... H01B 7/34
[58] Field of Search... 174/15 C, 23 C, 27, 110 PM, 174/110 V, 107

[56] References Cited
UNITED STATES PATENTS

| | | |
|---|---|---|
| 3,170,026 | 2/1965 | Woodson............................ 174/15 C |
| 3,429,979 | 2/1969 | Davey............................... 174/15 C |
| 3,441,660 | 4/1969 | Garner..................... 174/110 PM X |
| 3,509,266 | 4/1970 | Endacott............................ 174/15 C |

OTHER PUBLICATIONS

"Vinylite Plastics" Wire and Cable Insulation, Bakelite Corp. (4-10-45).

*Primary Examiner*—Arthur T. Grimley
*Attorney, Agent, or Firm*—Spencer & Kaye

[57] ABSTRACT

A current conducting system for efficiently conducting electric current in any one of a plurality of amplitude ranges by means of a cable disposed in a pipeline and constituted by a power conductor having a plastic insulation and at least one closed metal sheath, the system including devices for causing the pipeline to be selectively filled with air, when the current is in a low amplitude range; a hygroscopic water-containing medium when the current is in an intermediate amplitude range; and a circulating coolant when the current is in a high amplitude range.

13 Claims, 2 Drawing Figures

3,924,054

CURRENT CONDUCTING SYSTEM HAVING ADJUSTABLE HEAT DISSIPATION CAPABILITY

BACKGROUND OF THE INVENTION

The present invention relates to a system for transmitting electrical energy by means of power cables disposed within pipelines for various load level ranges.

During the planning and installation of new energy transmission systems it is often not possible to accurately determine the size and types of loads which the systems will be required to supply. When a new energy transmission system is designed exactly to the load to be expected with certainty, there exists the danger that it will not be able to handle higher loads which may be connected thereto. It is then necessary to build a new transmission system.

If the transmission system is dimensioned, however, so that its capacity exceeds the currently anticipated requirements, in order to be able to accommodate later increases, it is necessary to incure expenses which are initially higher and are not yet absolutely necessary.

Known energy transmission systems thus have the drawback that they are uneconomical and cannot be adapted to increasing energy requirements.

SUMMARY OF THE INVENTION

It is therefore an object of the present invention to avoid the above-mentioned drawbacks by providing a system for transmitting electrical energy which can be adapted to changing energy level requirements without undue expenditures.

It is a further object of the present invention to provide a method for operating such a system.

These and other objects according to the present invention are achieved by a system which includes at least one single conductor power cable with plastic insulation and at least one closed metal sheath installed in pipelines which are provided with devices for introducing a hygroscopic water-containing medium and with devices for operating a coolant circulating system.

The objects of the present invention are further achieved by a method for operating such a system according to which when the load to be expected for the cable is small, the air layer is left in the pipelines, while when a medium load is expected, a hygroscopic water-containing medium is introduced into the pipeline, and when the highest acceptable load is expected, the hygroscopic water-containing medium is removed from the pipeline and replaced by a circulating coolant via connections provided for this purpose. For the highest load to be expected, pump systems and cooling systems can thus be connected to effect the coolant circulation.

DESCRIPTION OF THE PREFERRED EMBODIMENTS

Figure 1:
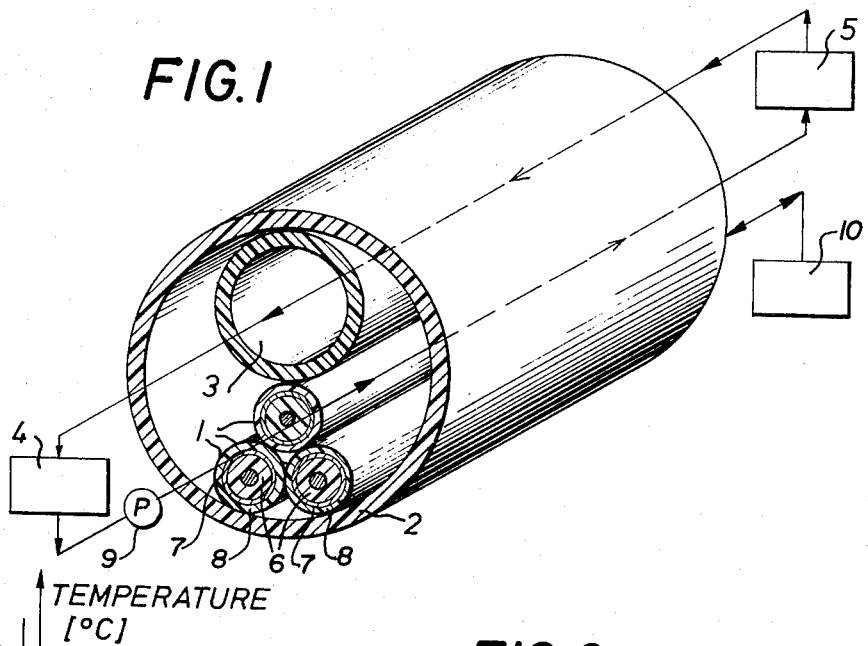
FIG. 1 is a schematic cross-sectional view of one embodiment of the system for transmitting electrical energy according to the present invention in which three single conductor power cables are installed in a cooling pipeline.

In preferred embodiments of the invention, each power cable 1 installed in such a pipeline is preferably provided as shown in FIG. 1 with a conductor insulation 6 of crosslinked polyethylene (XLPE) around which a sheath 7 of aluminum is placed. The aluminum sheath is in turn enclosed in a sheath 8 of polyethylene (PE).

The closed metal sheathing for the cable may alternatively be a sheath formed of layers of aluminum tape which has been preliminarily coated with a copolymer of PE. Specific polyethylene copolymers which can be employed are, for example, ethylenvinylacetate, ethylen-acrylate-copolymer or ethylen-propylene (ter) polymer.

This coated aluminum sheath can be enclosed by an outer sheath of PE.

The pipelines employed in the practice of the present invention consist of hard PVC or asbestos cement.

The hygroscopic water-containing medium to be employed may be an expanding powder, such as, for example, a methyl cellulose powder, which may also contain a heat-conductive material such as, for example, quartz meal. Instead of methylcellulose also methylcarboxyl-cellulose may be used. These hygroscopic mediums contain about 7 to 8 percent water in their dry state.

The coolant provided is preferably water.

The system for transmitting electrical energy according to the present invention has the advantage that it can be adapted to widely varying power requirements even after its installation. With small loads, the air layer contained in the pipeline is sufficient to keep the cable at a useful operating temperature. With a higher energy requirement a hygroscopic water-containing medium is introduced into the line system so that the load handling capability of the cable is substantially increased. At the third load level stage, when the load handling requirement is highest, the hygroscopic medium is flushed out of the pipeline and replaced by a circulating coolant.

Depending on the currently existing energy requirement the corresponding expenditures can be made for the operating configuration of the power transmission system.

After having been adapted to the medium or highest requirement level, the transmission system according to the present invention can be easily adapted to a lower energy requirement level by reestablishing the conditions associated with such lower level. Thus, uncorrectable provisions of either excess or insufficient capacity during planning are made impossible.

The high possible capacity of transmission systems according to the present invention and their easy adaptability to energy requirements which vary within wide limits is shown by the following example. Thus, for example, three cables 2 XHSY 1× 300/50 64/110kV, which are insulated with XLPE and have an outside diameter of 71 mm, situated within a pipeline of hard PVC with an inside diameter of 250 mm can carry, when the pipeline is filled with air up to 485 amps; by the introduction of water with methyl cellulose, it is possible to increase the load handling capacity to 580 amps; and by circulating water by a volume flow rate of 14 liters/sec over a distance of 5 km and return it through a return pipe of hard PVC (with an outside diameter of 120 mm) which is situated within the pipeline, too, and cooling the water at one end of the pipeline, the capacity can be increased to 915 amps; if the water is cooled on both ends the capacity can reach up to 1020 amps.

Referring now more particularly to the drawings, FIG. 1 shows in cross-section a part of a pipeline 2 which may consist of hard PVC. Within that pipeline 2 there are three single conductor cables 1 which have to be kept at a useful operating temperature. To achieve this goal at a small load stage the cooling of cables 1 is done by filling pipeline 2 with air. With a higher load of energy to be transmitted through cables 1 a hygroscopic water-containing medium is put into pipeline 2 from source 10, replacing the air. If still a higher load has to be carried, pipeline 2 is filled with circulating water which flows as indicated by arrows. The water is moved by a pump 9 well known in the art. The water is cooled by cooler 4; then it enters pipeline 2 at the end of which it is cooled again by cooler 5. Thereafter the water is returned through return pipe 3 which is situated within pipeline 2. Leaving return pipe 3 the water enters cooler 4 again to start a new cycle. If the load of cables 1 is not quite as high, one of coolers 4 or 5 may be deleted.

Figure 2:
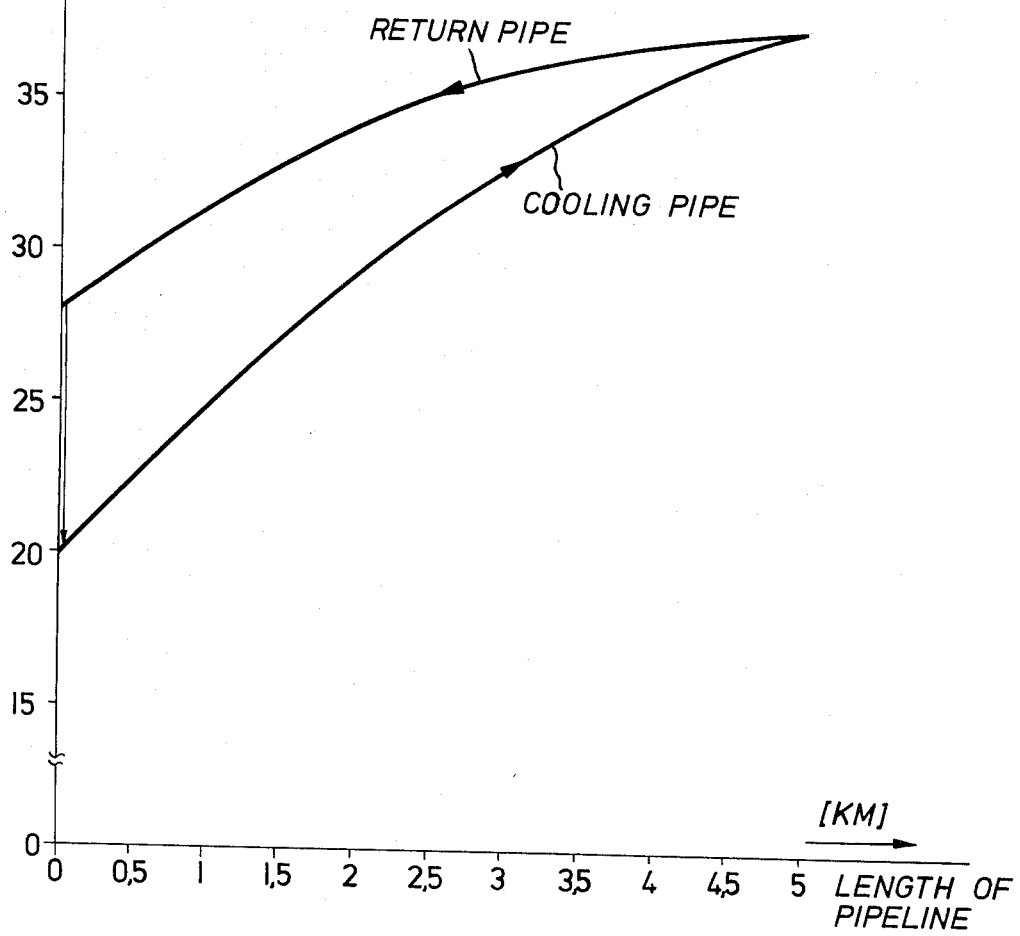
FIG. 2 shows a diagram of the coolant temperature values in functional dependency of the length of the pipeline.

Referring now to FIG. 2, the diagram shows the temperature of the cooling water flowing through a system as shown in FIG. 1 without cooler 5. For a length of the pipeline of 5 kilometers, a starting temperature of the water of 20°C, a volume flow rate of 14 liters/sec and 100kW/km to be carried off by the water, the water temperature is shown in functional dependency of the distance within the pipeline, i.e. for the pipeline itself (cooling pipe) as well as for the return pipe.

It will be understood that the above description of the present invention is susceptible to various modifications, changes and adaptations, and the same are intended to be comprehended within the meaning and range of equivalents of the appended claims.

I claim:

1. A system for transmitting electrical energy by means of power cables installed in pipelines and capable of efficiently conducting a plurality of current amplitude ranges, comprising, in combination:
   at least one single conductor power cable having plastic insulation and at least one closed metal sheath; a pipeline in which said cable is installed and normally filled with air when said cable is to conduct current in the lowest amplitude range; first means for selectively introducing a hygroscopic water-containing medium into said pipeline when said cable is to conduct current in an intermediate one of such plurality of amplitude ranges; and second means for selectively circulating a coolant through said pipeline when said cable is to conduct current in the highest of such plurality of amplitude ranges.

2. System as defined in claim 1 wherein said plastic insulation of said power cable is a crosslinked polyethylene, said metal sheath is of aluminum and surrounds said insulation and said cable further includes a polyethylene sheath surrounding said sheath.

3. System as defined in claim 1 wherein said sheath comprises at least one layer of polyethylene copolymer coated aluminum tape, and said cable further comprises an outer sheath of polyethylene.

4. System as defined in claim 1 wherein said pipeline is composed of hard polyvinylchloride.

5. System as defined in claim 1 further comprising a source containing a mass of an expanding powder constituting the hygroscopic water-containing medium, said source being connected to said selective introducing first means.

6. System as defined in claim 5 wherein said mass constituting said hygroscopic water-containing medium further includes an additive constituted by a heat-conductive material.

7. System as defined in claim 6 wherein the heat-conductive material is quartz meal.

8. System as defined in claim 5, wherein the expanding powder is a methyl cellulose powder.

9. System as defined in claim 1 further comprising a source of water constituting the coolant, said source being connected to said selective circulating second means.

10. A method for controlling the current-carrying capacity of a cable disposed in a pipeline for permitting the cable to conduct current efficiently in any one of a plurality of amplitude ranges, the cable being constituted by at least one single conductor power cable having plastic insulation and covered by at least one closed metal sheath; said method comprising, selectively: filling the pipeline with air when the cable is to conduct current in the lowest of such plurality of amplitude ranges; introducing a hygroscopic water-containing medium into the pipeline when the cable is to conduct current in an intermediate one of such plurality of amplitude ranges; and removing any water-containing medium present in the pipeline and circulating a coolant through the pipeline when the cable is to conduct current in the highest of such plurality of amplitude ranges.

11. A method as defined in claim 10 wherein said step of circulating is carried out by means of pump devices and circulating systems connected to be in communication with the interior of the pipeline.

12. A method as defined in claim 10 comprising, when the level of the current being conducted by the cable changes from one of such plurality of ranges to a lower one thereof, halting that one of said recited steps associated with the one of such plurality of ranges and commencing that one of said recited steps associated with the lower one of such plurality of ranges.

13. System as defined in claim 1 wherein said pipeline is composed of asbestos cement.

* * * * *